(12) United States Patent
Nagahama et al.

(10) Patent No.: US 8,393,248 B2
(45) Date of Patent: Mar. 12, 2013

(54) BAFFLE PLATE SUPPORT STRUCTURE FOR TRANSMISSION

(75) Inventors: Shinji Nagahama, Wako (JP); Isamu Shinbori, Wako (JP); Yoshimichi Tsubata, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 364 days.

(21) Appl. No.: 12/953,489

(22) Filed: Nov. 24, 2010

(65) Prior Publication Data

US 2011/0126667 A1   Jun. 2, 2011

(30) Foreign Application Priority Data

Nov. 30, 2009  (JP) ................................ 2009-272719

(51) Int. Cl.
*F16H 57/04*  (2010.01)
(52) U.S. Cl. ..................................... 74/606 R; 184/6.12
(58) Field of Classification Search .................... 74/467, 74/606 A, 606 R, 607; 184/6.12; 403/364, 403/375; 475/159
See application file for complete search history.

(56) References Cited

U.S. PATENT DOCUMENTS

| 3,625,310 | A  | * | 12/1971 | Herrick ......................... 184/6.12 |
| 6,374,951 | B1 | * | 4/2002  | Michelhaugh et al. ...... 184/13.1 |
| 6,467,578 | B1 | * | 10/2002 | Winfree ........................ 184/6.12 |
| 7,421,921 | B2 | * | 9/2008  | Kimura et al. .................. 74/331 |
| 7,984,791 | B2 | * | 7/2011  | Taguchi et al. .............. 184/6.12 |
| 2006/0179973 | A1 | * | 8/2006 | Matsufuji et al. ........... 74/606 R |

FOREIGN PATENT DOCUMENTS

JP    04136559 A  *  5/1992
JP    2005-308044    11/2005

* cited by examiner

*Primary Examiner* — Richard W Ridley
*Assistant Examiner* — Adam D Rogers
(74) *Attorney, Agent, or Firm* — Ditthavong Mori & Steiner, P.C.

(57) ABSTRACT

A baffle plate support structure supports a baffle plate inside a casing of a transmission. The baffle plate support structure includes a fixing portion and a supporting portion. The fixing portion secures a fixed end of the baffle plate to the casing by tightening bolts. The fixed end is one end of the baffle plate. The supporting portion supports a supported end of the baffle plate with respect to the casing. The supported end is another end of the baffle plate. The supporting portion has protruding ribs formed on an inner surface of the casing. The supporting portion is positioned such that the protruding ribs have a clearance of predetermined distance with respect to the supported end of the baffle plate in a vibrating direction of the supported end.

8 Claims, 5 Drawing Sheets

BAFFLE PLATE SUPPORT STRUCTURE FOR TRANSMISSION

CROSS-REFERENCE TO RELATED APPLICATIONS

The present application claims priority under 35 U.S.C. §119 to Japanese Patent Application No. 2009-272719, filed Nov. 30, 2009, entitled "Baffle Plate Support Structure for Transmission." The contents of this application are incorporated herein by reference in their entirety.

BACKGROUND OF THE INVENTION

1. Field of the Invention

The present invention relates to a baffle plate support structure for a transmission.

2. Description of the Related Art

In a casing of a transmission mounted on a vehicle, a baffle plate for reducing oil agitation resistance (stirring resistance) of gears is provided, for example, as described in Japanese Unexamined Patent Application Publication No. 2005-308044. The baffle plate is a plate-like member made of synthetic resin. The baffle plate is mounted such that it extends along the lower rotational periphery of gears and pulleys around rotating shafts. The baffle plate is composed of a series of curved surfaces that extend not only along the rotational periphery of gears, but also extend in a plane along the axial direction of the rotating shafts. Therefore, the baffle plate is a plate-like resin component having a relatively large area.

Such a baffle plate is provided with a support structure by which, in the casing of the transmission, both ends of the baffle plate are supported with respect to the inner surface of the casing. However, if both ends of the baffle plate are secured by tightening bolts etc. without play, vibration applied to the transmission while the vehicle is moving may cause resonance (surface vibration) of the baffle plate. This may lead to warpage of the baffle plate and shorten the vibration life of the baffle plate.

To prevent resonance of such a baffle plate in a known transmission, the baffle plate is secured by tightening bolts at one end only, and the other end of the baffle plate is provided as a free end not in contact with the casing, as described in Japanese Unexamined Patent Application Publication No. 2005-308044. That is, the support structure for the baffle plate provided here is a so-called cantilever support structure. However, if one end of the baffle plate is a free end which is not at all in contact with the casing, it is difficult to properly suppress excess vibration of the baffle plate.

In the cantilever support structure described in Japanese Unexamined Patent Application Publication No. 2005-308044, the free end of the baffle plate is covered with a transmission case. The free end of the baffle plate is located near the bottom inside the transmission case. This means that it may not be easy to check the mounting at the free end during assembly of the transmission. Therefore, it is difficult to add a support structure, which requires checking of mounting, to the free end of the baffle plate.

A manual transmission also has a baffle plate mounted inside the casing thereof. A baffle plate support structure used here is, for example, one that supports the baffle plate not by completely securing it to the casing at both ends, but by securing it to the casing with some play left therebetween (in a so-called floating state). However, use of such a support structure may result in insufficient mounting strength of the baffle plate. Moreover, since the amount of displacement associated with vibration of the baffle plate increases, it is necessary to leave a large clearance between the baffle plate and gears. This may hinder a reduction in size of the transmission. Additionally, significant vibration of the baffle plate and looseness of the support structure may cause noise.

SUMMARY OF THE INVENTION

According to one aspect of the present invention, a baffle plate support structure is for a transmission. The transmission includes a casing, rotating shafts mounted inside the casing, rotating bodies rotatably mounted about the respective rotating shafts, and a baffle plate extending inside the casing in a plane along the rotational periphery of the rotating bodies and in a plane along an axial direction of the rotating shafts. The baffle plate support structure supports the baffle plate inside the casing. The baffle plate support structure includes a fixing portion and a supporting portion. The fixing portion secures a fixed end of the baffle plate to the casing by tightening bolts. The fixed end is one end of the baffle plate. The supporting portion supports a supported end of the baffle plate with respect to the casing. The supported end is another end of the baffle plate. The supporting portion has protruding ribs formed on an inner surface of the casing. The supporting portion is positioned such that the protruding ribs have a clearance of predetermined distance with respect to the supported end of the baffle plate in a vibrating direction of the supported end.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4A and FIG. 4B illustrate ribs inside the transmission case. FIG. 5A to FIG. 5D illustrate detailed structures of supporting portions.

DESCRIPTION OF THE EMBODIMENTS

Embodiments of the present invention will now be described in detail with reference to the attached drawings.

Figure 1:
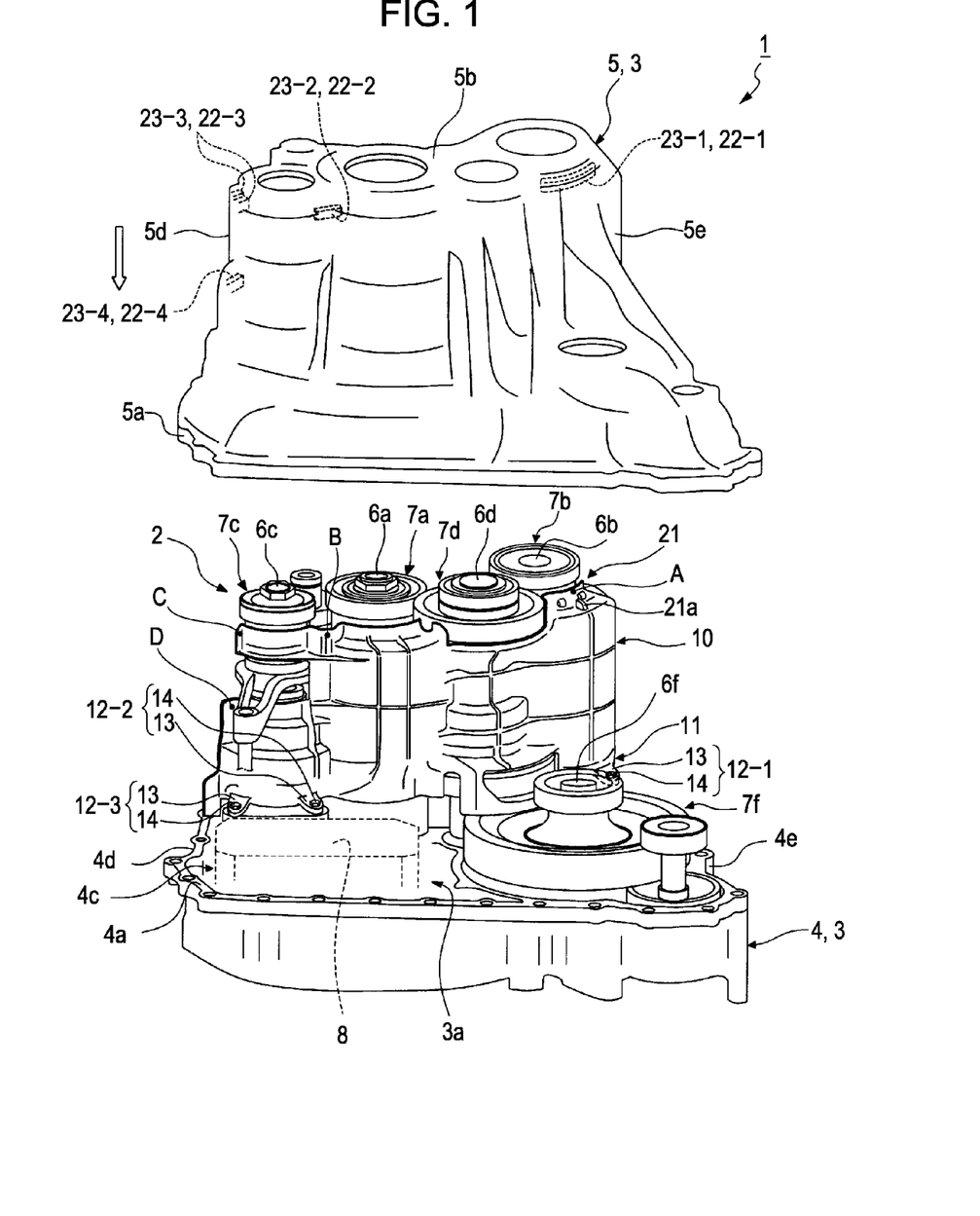
FIG. 1 is a schematic exploded perspective view illustrating an overall structure of a transmission that includes a baffle plate support structure according to an embodiment of the present invention.
Figure 2:
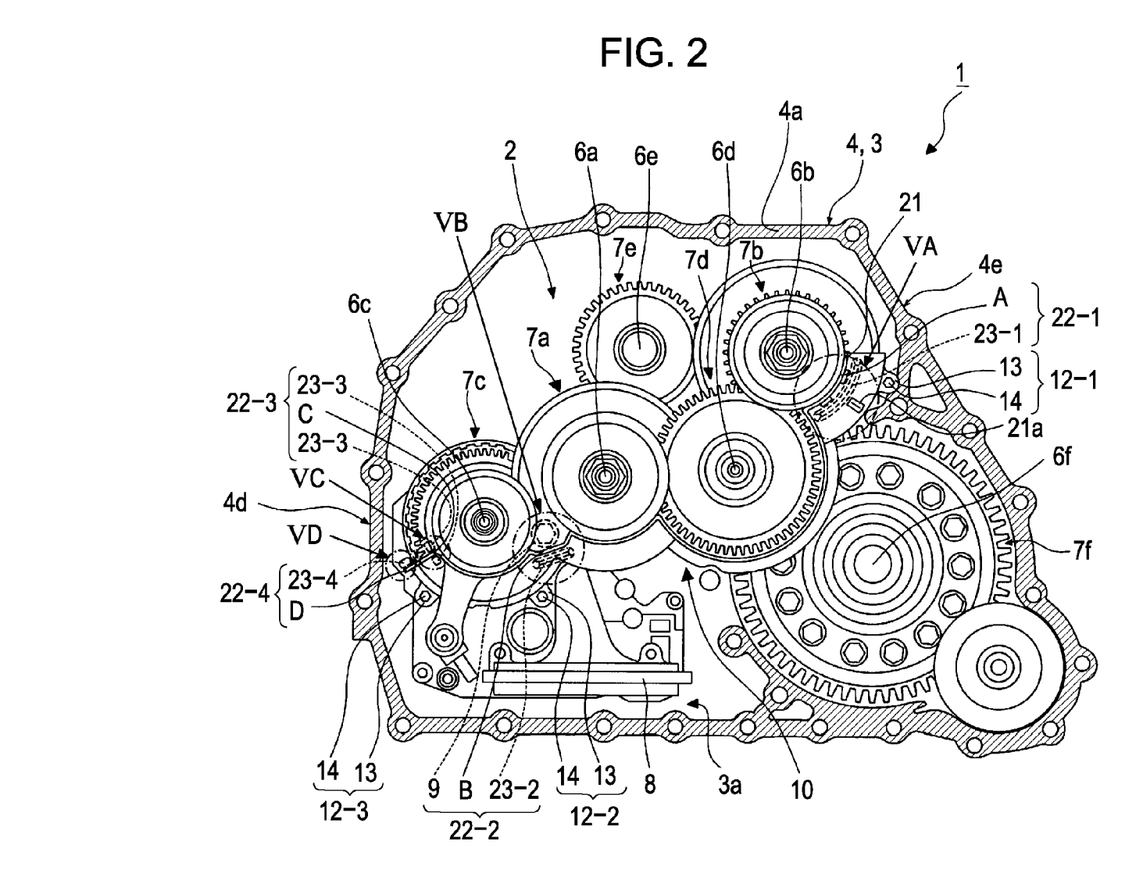
FIG. 2 is a side view of an interior of a torque converter case and a gear mechanism as viewed in an axial direction.
Figure 3:
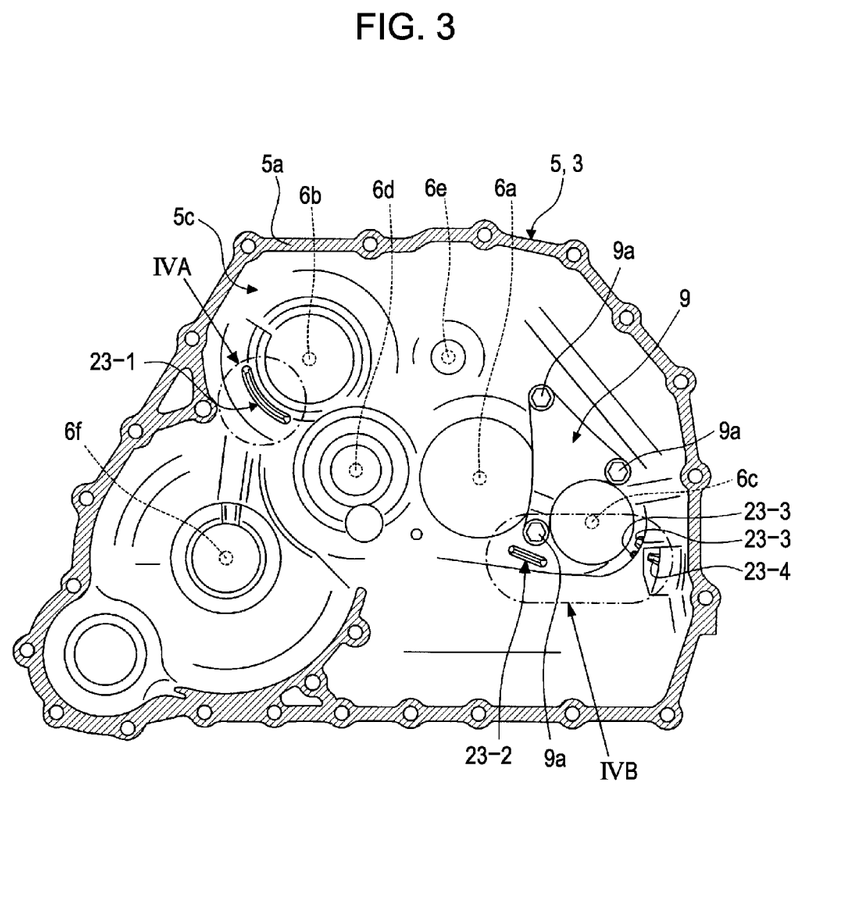
FIG. 3 is a side view of an interior of a transmission case as viewed in the axial direction.

FIG. 1 is a schematic exploded perspective view illustrating an overall structure of a transmission 1 that includes a baffle plate support structure according to an embodiment of the present invention. FIG. 2 is a side view of an interior of a torque converter case (first case) 4 and a gear mechanism 2 included in the transmission 1, as viewed in an axial direction. FIG. 3 is a side view of an interior of a transmission case (second case) 5 included in the transmission 1 as viewed in the axial direction. Note that FIG. 1 illustrates the transmission 1 as it is oriented during its assembly, and FIG. 2 and FIG. 3 illustrate the transmission 1 as it is oriented when mounted on a vehicle. In FIG. 2, ribs 23 (23-1 to 23-4) formed on the transmission case 5 are indicated by dotted lines. In FIG. 3, rotating shafts 6 (6a to 6f) included in the gear mechanism 2 are indicated by dotted lines. In FIG. 1, a component assembly 8 (see FIG. 2) including an oil strainer and mounted at a bottom 3a inside a casing 3 of the transmission 1 is schematically indicated by a dotted line.

The transmission 1 of the present embodiment is an automatic transmission of parallel axis type. As illustrated in FIG. 2, the transmission 1 includes the gear mechanism 2 having the rotating shafts 6 (6a to 6f) and gears (rotating bodies) 7 (7a to 7f) rotatably mounted about the respective rotating shafts 6, the component assembly 8 including the oil strainer, and the casing 3 containing the gear mechanism 2 and the component assembly 8. The rotating shafts 6 includes a first input shaft (main shaft) 6a, a second input shaft 6b, a third input shaft 6c, an output shaft (counter shaft) 6d, an idle shaft 6e, and a differential shaft 6f. The rotating shafts 6a to 6f are disposed parallel to each other. In the following description, the term "axial direction" refers to the axial direction of the rotating shafts 6.

As illustrated in FIG. 1, the casing 3 containing the gear mechanism 2 is composed of the torque converter case 4 and the transmission case 5. The torque converter case 4 surrounds the end face of the gear mechanism 2 adjacent to a torque converter (not shown), and the transmission case 5 surrounds the rotational periphery of the gear mechanism 2. Both the torque converter case 4 and the transmission case 5 are shaped like a container having a bottom, and are open at one end in the axial direction. The torque converter case 4 and the transmission case 5 are joined to each other by tightening bolts (not shown), with their open ends 4a and 5a facing each other. In the assembly process of the transmission 1, as illustrated in FIG. 1, the gear mechanism 2 and other components are vertically mounted, along the axial direction, into the torque converter case 4 placed with the open end 4a facing upward. In this state, the transmission case 5 placed over the gear mechanism 2 is joined to the torque converter case 4.

As illustrated in FIG. 2, the transmission 1 is mounted on the vehicle in a transverse state, where the rotating shafts 6 (6a to 6f) extend horizontally. A molded baffle plate 10 made of synthetic resin is disposed on the underside of the gear mechanism 2 inside the casing 3. The baffle plate 10 is a plate-like member extending along the underside of the gear mechanism 2 (not including the differential shaft 6f and a differential gear 7f here) and located between the gear mechanism 2 and the bottom 3a of the casing 3. As viewed in the axial direction, the baffle plate 10 is composed of a series of semicircular arc-shaped surfaces that extend along the lower half of the rotational periphery of each of the gears 7a to 7d. As illustrated in FIG. 1, the baffle plate 10 extends from the torque converter case 4, in the axial direction of the rotating shafts 6, to the vicinity of a back end 5b of the transmission case 5. That is, the baffle plate 10 extends not only in a plane along the rotational periphery of the gears 7a to 7d, but also in a plane along the axial direction of the rotating shafts 6. The bottom 3a of the casing 3 and the gears 7a to 7d in the gear mechanism 2 are separated by the baffle plate 10, so that the gears 7a to 7d are isolated from oil accumulating at the bottom 3a of the casing 3.

As illustrated in FIG. 1, one end (lower end in FIG. 1) of the baffle plate 10 in the axial direction is a fixed end 11 secured to the torque converter case 4. As illustrated in FIG. 2, the fixed end 11 extends transversely from the vicinity of one side face 4d to the vicinity of the other side face 4e inside the torque converter case 4. The fixed end 11 is secured by a plurality of fixing portions 12 (12-1 to 12-3). The fixing portions 12 are provided at a total of three positions along the fixed end 11 of the baffle plate 10. Specifically, the fixing portions 12 include a first fixing portion 12-1 on the periphery of the second input shaft 6b, and a second fixing portion 12-2 and a third fixing portion 12-3 at different positions on the periphery of the third input shaft 6c.

The three fixing portions 12-1 to 12-3 have the same structure. Specifically, the fixing portions 12-1 to 12-3 each have a tongue-shaped fixing piece 13 protruding outward from the fixed end 11 of the baffle plate 10 (i.e., in the outward direction substantially orthogonal to the surface of the baffle plate 10), and a bolt 14 for securing the fixing piece 13 to the torque converter case 4. That is, the fixed end 11 is secured to an inner surface 4c of the torque converter case 4 by tightening the bolts 14.

The other end (upper end in FIG. 1) of the baffle plate 10 in the axial direction is a supported end 21 supported with respect to an inner surface 5c (see FIG. 3) of the transmission case 5, with a predetermined clearance left therebetween. As illustrated in FIG. 1, the supported end 21 extends transversely from the vicinity of one side face 5d to the vicinity of the other side face 5e inside the transmission case 5. As illustrated in FIG. 2, supporting portions 22 for supporting the supported end 21 are provided at four positions along the supported end 21. Specifically, the supporting portions 22 includes a first supporting portion 22-1, a second supporting portion 22-2, a third supporting portion 22-3, and a fourth supporting portion 22-4 that support points A, B, C, and D, respectively, of the baffle plate 10. The point A of the supported end 21 is located on the periphery of the second input shaft 6b, the point B is located on the periphery between the first input shaft 6a and the third input shaft 6c, the point C is located on the periphery of the third input shaft 6c, and the point D (see FIG. 1) is located on the periphery of the third input shaft 6c and at substantially the center between the fixed end 11 and the supported end 21. The points A and B of the supported end 21 are arranged in a plane substantially along the rotational periphery of the gears 7 (7a to 7d). The points C and D are arranged in a plane extending outward radially from the axial center of the third input shaft 6c.

As illustrated in FIG. 1 and FIG. 2, the fixing portions 12-1 to 12-3 and the supporting portions 22-1 to 22-4 at their corresponding ends 11 and 21 of the baffle plate 10 are arranged at positions opposite each other in the axial direction (i.e., at substantially symmetrical positions in the axial direction). Specifically, the first supporting portion 22-1 and the first fixing portion 12-1 are arranged opposite each other, the second supporting portion 22-2 and the second fixing portion 12-2 are arranged opposite each other, and the third and fourth supporting portions 22-3 and 22-4 and the third fixing portion 12-3 are arranged opposite each other.

The supporting portions 22 (22-1 to 22-4) have protruding ribs 23 (23-1 to 23-4) formed on the inner surface 5c of the transmission case 5. The protruding ribs 23 and the corresponding supported end 21 of the baffle plate 10 have a predetermined clearance L (see FIG. 5A to FIG. 5D) therebetween.

Figure 4A:
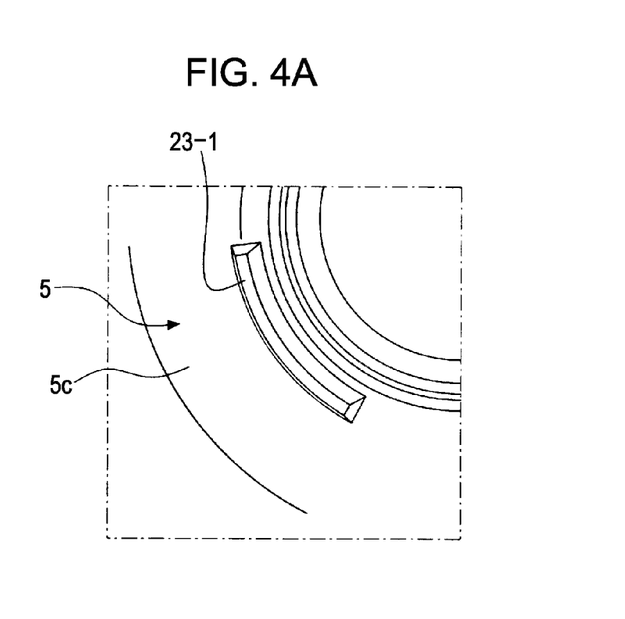
FIG. 4A is an enlarged view of a IVA portion of FIG. 3.
Figure 4B:
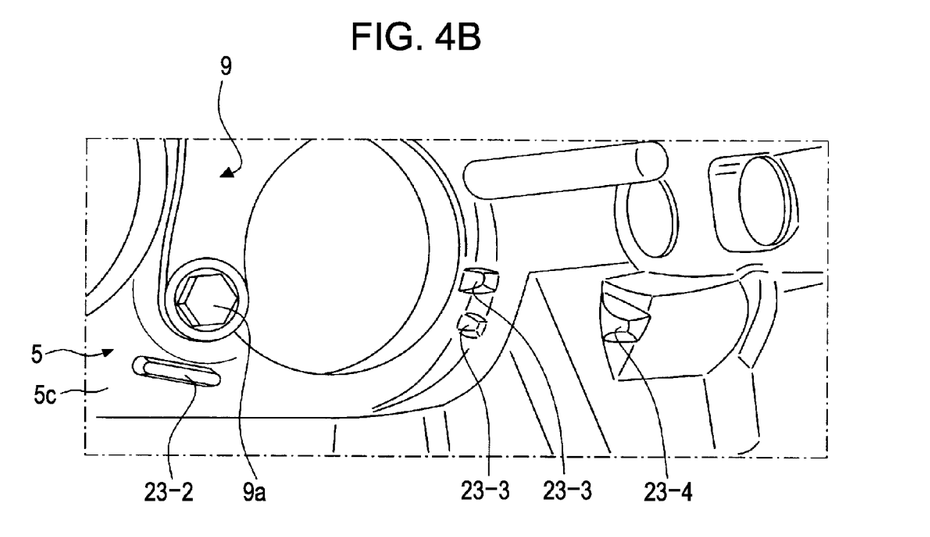
FIG. 4B is an enlarged view of a IVB portion of FIG. 3.

Detailed structures of the first to fourth supporting portions 22-1 to 22-4 will now be described. FIG. 4A and FIG. 4B illustrate the ribs 23 (23-1 to 23-4) formed on the inner surface 5c of the transmission case 5. FIG. 4A is an enlarged view of a IVA portion of FIG. 3, and FIG. 4B is an enlarged view of a IVB portion of FIG. 3. FIG. 5A to FIG. 5D illustrate detailed structures of the supporting portions 22-1 to 22-4. FIG. 5A, FIG. 5B, FIG. 5C, and FIG. 5D are schematic cross-sectional views of VA, VB, VC, and VD, respectively, of FIG. 2. Note that the cross-sectional views of FIG. 5A to FIG. 5D schematically illustrate cross sections of the supporting portions 22-1 to 22-4 for explaining the arrangement of the supported end 21 and the ribs 23-1 to 23-4, and the illustrated shapes may not necessarily be accurate.

Figure 5A:
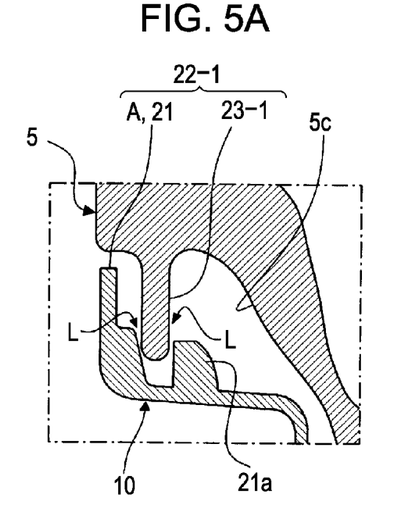
FIG. 5A, FIG. 5B, FIG. 5C, and FIG. 5D are schematic cross-sectional views of VA, VB, VC, and VD, respectively, of FIG. 2.

As illustrated in FIG. 4A and FIG. 5A, the first supporting portion 22-1 has the rib 23-1 formed at a position facing the point A in the supported end 21 of the baffle plate 10. The rib 23-1 is a substantially arc-shaped protrusion extending along the point A of the supported end 21 and its vicinity. Additionally, a small protrusion 21a is formed at a position along the point A in the supported end 21 of the baffle plate 10 (i.e., at a position outside the point A in the radial direction), at a distance from the side face of the supported end 21. The rib 23-1 is positioned such that a clearance L of predetermined distance is left between one side of the rib 23-1 and its opposite side of the point A of the supported end 21 (specifically, a side of a raised portion formed on one side of the point A), and also between the other side of the rib 23-1 and its opposite side of the small protrusion 21a, in a vibrating direction of the supported end (i.e., in a direction in which the supported end 21 vibrates in response to vibration of the baffle plate 10). In other words, the rib 23-1 is sandwiched between the point A of the supported end 21 and the small protrusion 21a, with the clearance L on each side.

Figure 5B:
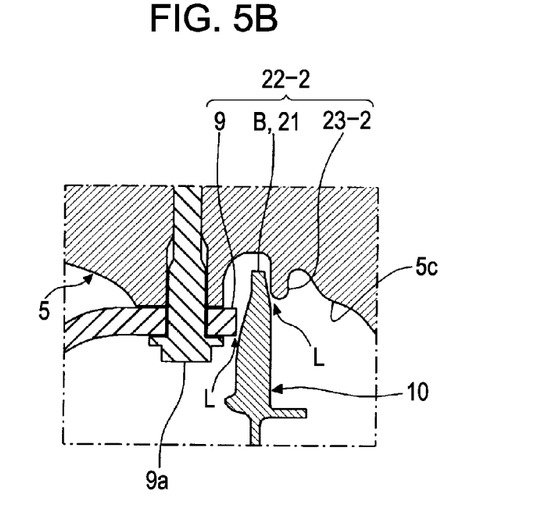

As illustrated in FIG. 4B and FIG. 5B, the second supporting portion 22-2 has the rib 23-2 formed at a position facing the point B in the supported end 21 of the baffle plate 10. The rib 23-2 is a substantially linear protrusion adjacent to the point B of the supported end 21. As illustrated in FIG. 3, a plate-like holder 9 is mounted near the rib 23-2 on the inner surface 5c of the transmission case 5. The holder 9 is secured to the inner surface 5c of the transmission case 5 by tightening bolts 9a. As illustrated in FIG. 5B, an end portion of the holder 9 faces one side of the point B of the supported end 21. Thus, the point B of the supported end 21 is sandwiched between the rib 23-2 and the holder 9. A clearance L of predetermined distance is left between one side of the rib 23-2 and its opposite side of the point B, and between the end portion of the holder 9 and its opposite side of the point B.

Figure 5C:
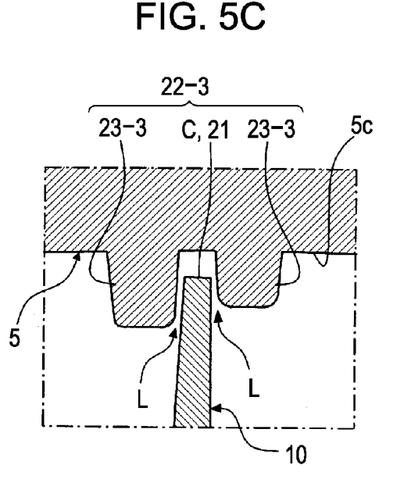

As illustrated in FIG. 4B and FIG. 5C, the third supporting portion 22-3 has the protruding ribs 23-3 and 23-3 formed in a pair. The protruding ribs 23-3 and 23-3 are positioned on respective sides of the point C in the supported end 21 of the baffle plate 10 such that the point C is sandwiched between the ribs 23-3 and 23-3. As illustrated in FIG. 3, on the inner surface 5c of the transmission case 5, the ribs 23-3 and 23-3 protrude from the outside of the third input shaft 6c toward its axial center. The ribs 23-3 and 23-3 are spaced at a predetermined distance from each other, with the point C of the supported end 21 interposed therebetween. A clearance L of predetermined distance is left between each side of the point C and its opposite side of the corresponding rib 23-3.

Figure 5D:
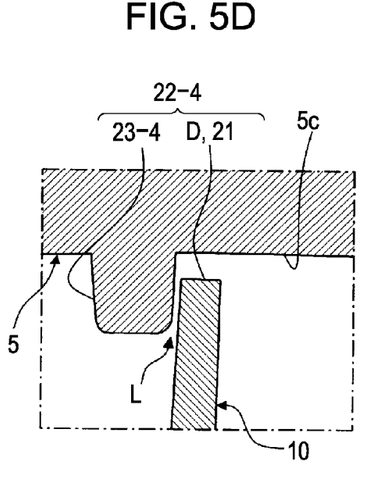

As illustrated in FIG. 4B and FIG. 5D, the fourth supporting portion 22-4 has the protruding rib 23-4 formed at a position facing one side of the point D in the supported end 21 of the baffle plate 10. As illustrated in FIG. 3, on the inner surface 5c of the transmission case 5, the rib 23-4 protrudes from the outside of the third input shaft 6c toward its axial center. A clearance L of predetermined distance is left between one side of the rib 23-4 and its opposite side of the point D of the supported end 21.

The clearance L between the supported end 21 of the baffle plate 10 and the ribs 23-1 to 23-4 of the supporting portions 22-1 to 22-4 is set such that when the baffle plate 10 vibrates in response to vibration transmitted from the transmission 1 while the vehicle is moving etc., if the level of vibration of the baffle plate 10 exceeds a predetermined level, the supported end 21 of the baffle plate 10 comes into contact with the ribs 23-1 to 23-4 to restrict the vibration. For example, the clearance L may be set to about 0.9 mm. The size of the clearance L in each of the supporting portions 22-1 to 22-4 is not limited to this, and each clearance L may have a different size.

Of processes involved in assembling the transmission 1 having the structure described above, a process related to mounting of the baffle plate 10 placed inside the casing 3 will now be described. As illustrated in FIG. 1, with the gear mechanism 2 placed inside the torque converter case 4, the fixed end 11 of the baffle plate 10 is secured to the torque converter case 4 by tightening the bolts 14 of the first to third fixing portions 12-1 to 12-3. Then, the transmission case 5 is placed over the gear mechanism 2. The open end 4a of the torque converter case 4 and the open end 5a of the transmission case 5 facing each other are secured by tightening the bolts. Thus, the gear mechanism 2 placed inside the torque converter case 4 is covered with the transmission case 5.

By mounting the transmission case 5 in accordance with the process described above, the ribs 23-1 to 23-4 formed on the inner surface 5c of the transmission case 5, as illustrated in FIG. 2 and FIG. 5A to FIG. 5D, are positioned to have a predetermined clearance L with respect to the supported end 21 of the baffle plate 10. The first to fourth supporting portions 22-1 to 22-4 for supporting the supported end 21 of the baffle plate 10 are formed in this manner. Thus, in the casing 3, the fixed end 11 which is one end of the baffle plate 10 is secured to the torque converter case 4 by tightening the bolts 14, while the supported end 21 which is the other end of the baffle plate 10 is positioned to have a predetermined clearance L with respect to the ribs 23 formed on the inner surface 5c of the transmission case 5.

As described above, with the baffle plate support structure of the present embodiment, the fixed end 11 which is one end of the baffle plate 10 is secured to the casing 3 by tightening the bolts 14, while the supported end 21 which is the other end of the baffle plate 10 is positioned to have a predetermined clearance L with respect to the protruding ribs 23 formed on the inner surface 5c of the casing 3. Since the clearance L between the protruding ribs 23 (23-1 to 23-4) and the supported end 21 of the baffle plate 10 is set to an appropriate value, when the level of vibration of the baffle plate 10 exceeds a predetermined level, the supported end 21 of the baffle plate 10 comes into contact with the ribs 23-1 to 23-4 to restrict the vibration.

This makes it possible to solve the problems associated with the known structure. That is, with the support structure of the present embodiment, it is possible to prevent resonance of the baffle plate that occurs when both ends of the baffle plate are completely secured, and also to prevent significant vibration of one end of the baffle plate that occurs when the one end is not at all in contact with the casing. Therefore, excessive vibration of the baffle plate 10 can be effectively suppressed. Moreover, since warpage of the baffle plate 10 caused by vibration of the transmission 1 can be significantly reduced, vibration life of the baffle plate 10 is improved.

In the present embodiment, the baffle plate 10 is supported by a floating support structure which allows only one end (supported end) 21 of the baffle plate 10 to have a clearance L. Therefore, as compared to the known structure in which the baffle plate is supported by a floating support structure at both ends, even if a clearance between the baffle plate 10 and the gears 7a to 7d is set to a smaller value, interference between the baffle plate 10 and the gears 7a to 7d can be avoided. This makes it possible to achieve a size reduction of the transmission 1. At the same time, noise caused by vibration of the baffle plate 10 can be suppressed.

In the baffle plate support structure described above, the ribs 23-3 and 23-3 included in the third supporting portion 22-3 are positioned on respective sides of the supported end 21 of the baffle plate 10 such that the supported end 21 is sandwiched between the ribs 23-3 and 23-3. With this structure, it is possible to effectively suppress vibration of the supported end 21 of the baffle plate 10. Additionally, in the second supporting portion 22-2, the point B of the supported end 21 is sandwiched between the rib 23-2 and the holder 9. Thus, since the supported end 21 of the baffle plate 10 is sandwiched between a rib and another component, vibration of the supported end 21 of the baffle plate 10 can be effectively suppressed.

In the baffle plate support structure described above, a plurality of fixing portions 12 (12-1 to 12-3) and a plurality of supporting portions 22 (22-1 to 22-4) are provided. The fixing portions 12-1 to 12-3 and the supporting portions 22-1 to 22-4 are arranged at opposite positions at the corresponding ends 11 and 21 of the baffle plate 10. Thus, since the fixing portions 12-1 to 12-3 and the supporting portions 22-1 to 22-4 at their corresponding ends of the baffle plate 10 are arranged in a symmetrical manner, the baffle plate 10 having a relatively large area can be evenly supported. Therefore, it is possible to significantly reduce warpage that occurs in the baffle plate 10 when vibration is input, and to improve vibration life of the baffle plate 10.

In the present embodiment described above, the casing 3 is composed of the torque converter case 4 and the transmission case 5 facing each other at their respective open ends 4a and 5a in the axial direction of the rotating shafts 6. When the transmission 1 is assembled, the transmission case 5 placed over the supported end 21 of the baffle plate 10 is joined to the torque converter case 4 to which the fixed end 11 of the baffle plate 10 is secured. Thus, the ribs 23 are positioned to have the clearance L with respect to the supported end 21 of the baffle plate 10. Therefore, in the assembly process of the transmission 1, the supporting portions 22 (22-1 to 22-4) can be provided simply by placing the transmission case 5 over the supported end 21 of the baffle plate 10. Additionally, it becomes unnecessary to check the mounting of the supporting portions 22. Therefore, even if the transmission 1 is provided with the support structure of the embodiment of the present invention, there is no increase in work burden in the assembly process of the transmission 1. With the supporting portions 22 described above, both the ends 11 and 21 of the baffle plate 10 can be evenly supported.

Although the embodiments of the present invention have been described above, it will be understood that the present invention is not limited to the described embodiments and various modifications may be made within the technical scope set forth in the claims, specification, and drawings. Any shapes, structures, and materials that are not explicitly disclosed in the specification and drawings are included in the technical scope of the present invention as long as they have advantageous effects of the present invention.

For example, in the embodiments described above, the baffle plate support structure according to the present invention is applied to an automatic transmission of parallel axis type. However, the baffle plate support structure according to the embodiment of the present invention is applicable to automatic transmissions having structures other than the parallel axis structure, and is applicable not only to automatic transmissions but also to manual transmissions. The specific numbers and arrangements of the fixing portions and supporting portions of the embodiments described above are merely examples. The numbers and arrangements of the fixing portions and supporting portions of the baffle plate support structure according to the embodiment of the present invention may be different from those in the embodiments described above.

In the baffle plate support structure for the transmission according to the embodiment of the present invention, the fixed end, which is one end of the baffle plate, is secured to the casing by tightening the bolts, while the supported end, which is the other end of the baffle plate, is positioned such that there is a clearance of predetermined distance with respect to the protruding ribs formed on the inner surface of the casing. Therefore, when the clearance between the protruding ribs and the supported end is set to an appropriate value, if the level of vibration of the baffle plate exceeds a predetermined level, the supported end comes into contact with the ribs to restrict the vibration. This makes it possible to solve the problems associated with the known structure. That is, with the baffle plate support structure described above, it is possible to prevent resonance of the baffle plate that occurs when both ends of the baffle plate are completely secured, and also to prevent significant vibration of one end of the baffle plate that occurs when the one end is not at all in contact with the casing. Therefore, excessive vibration of the baffle plate can be effectively suppressed. Moreover, since warpage of the baffle plate caused by vibration of the transmission can be significantly reduced, vibration life of the baffle plate is improved. At the same time, noise caused by vibration of the baffle plate can be suppressed.

Also, as compared to the known structure in which the baffle plate is supported by a floating support structure at both ends, even if a clearance between the baffle plate and the rotating bodies is set to a smaller value, interference between the baffle plate and the rotating bodies can be avoided. This makes it possible to achieve a size reduction of the transmission.

In the baffle plate support structure described above, the protruding ribs (23-3) may be positioned on respective sides of the supported end (21) of the baffle plate (10) such that the supported end (21) is sandwiched between the ribs (23-3). This makes it possible to effectively suppress vibration of the supported end of the baffle plate and restrict vibration of the baffle plate.

In the baffle plate support structure described above, the fixing portion (12) and the supporting portion (22) each may be provided in a plurality. The fixing portions (12-1 to 12-3) and the supporting portions (22-1 to 22-4) may be arranged at opposite positions at the corresponding ends (11 and 21) of the baffle plate (10). Since the fixing portions and the supporting portions at their corresponding ends of the baffle plate are arranged in a symmetrical manner, the baffle plate can be evenly supported. This makes it possible to effectively suppress vibration of the baffle plate.

In the baffle plate support structure described above, the casing (3) may be composed of a first case (4) and a second case (5) facing each other at their respective open ends (4a and 5a) that are open in the axial direction of the rotating shafts (6). When the transmission (1) is assembled, the second case (5) placed over the supported end (21) of the baffle plate (10) may be joined to the first case (4) to which the fixed end (11) of the baffle plate (10) is secured, so that the ribs (23) are positioned to have the clearance (L) with respect to the supported end (21) of the baffle plate (10). Thus, in the assembly process of the transmission, the supporting portions of the embodiment of the present invention can be provided simply by placing the second case over the supported end of the baffle plate. Additionally, it becomes unnecessary to check the mounting of the supporting portions. Therefore, even if the transmission is provided with the support structure of the embodiment of the present invention, there is no increase in work burden in the assembly process of the transmission. With the supporting portions described above, both ends of the baffle plate can be evenly supported.

With the baffle plate support structure for the transmission according to the embodiment of the present invention, vibration of the baffle plate can be effectively suppressed with a simple structure.

Obviously, numerous modifications and variations of the present invention are possible in light of the above teachings. It is therefore to be understood that within the scope of the appended claims, the invention may be practiced otherwise than as specifically described herein.

What is claimed is:

1. A baffle plate support structure for a transmission, the transmission comprising a casing, rotating shafts mounted inside the casing, rotating bodies rotatably mounted about the rotating shafts, and a baffle plate extending inside the casing in a plane along a rotational periphery of the rotating bodies and in a plane along an axial direction of the rotating shafts, the baffle plate support structure supporting the baffle plate inside the casing, the baffle plate support structure comprising:
   a fixing portion to secure a fixed end of the baffle plate to the casing by tightening bolts, the fixed end being one end of the baffle plate; and
   a supporting portion to support a supported end of the baffle plate with respect to the casing, the supported end being another end of the baffle plate, the supporting portion having protruding ribs formed on an inner surface of the casing, the supporting portion being positioned such that the protruding ribs have a clearance of predetermined distance with respect to the supported end of the baffle plate in a vibrating direction of the supported end.

2. The baffle plate support structure for the transmission according to claim 1, wherein the protruding ribs are positioned on sides of the supported end such that the supported end is sandwiched between the protruding ribs.

3. The baffle plate support structure for the transmission according to claim 2, wherein the fixing portion comprises a plurality of fixing portions and the supporting portion comprises a plurality of supporting portions, the plurality of fixing portions and the plurality of supporting portions being arranged at opposite positions at the fixed end and the supported end of the baffle plate.

4. The baffle plate support structure for the transmission according to claim 3,
   wherein the casing comprises
      a first case having an open end that is open in the axial direction of the rotating shafts, and
      a second case having another open end that is open in the axial direction of the rotating shafts and faces the open end of the first case, and
   wherein when the transmission is assembled, the fixed end of the baffle plate is secured to the first case, and the second case is placed over the supported end of the baffle plate and joined to the first case to which the fixed end of the baffle plate is secured, so that the protruding ribs are positioned to have the clearance with respect to the supported end.

5. The baffle plate support structure for the transmission according to claim 2,
   wherein the casing comprises
      a first case having an open end that is open in the axial direction of the rotating shafts, and
      a second case having another open end that is open in the axial direction of the rotating shafts and faces the open end of the first case, and
   wherein when the transmission is assembled, the fixed end of the baffle plate is secured to the first case, and the second case is placed over the supported end of the baffle plate and joined to the first case to which the fixed end of the baffle plate is secured, so that the protruding ribs are positioned to have the clearance with respect to the supported end.

6. The baffle plate support structure for the transmission according to claim 1, wherein the fixing portion comprises a plurality of fixing portions and the supporting portion comprises a plurality of supporting portions, the plurality of fixing portions and the plurality of supporting portions being arranged at opposite positions at the fixed end and the supported end of the baffle plate.

7. The baffle plate support structure for the transmission according to claim 6,
   wherein the casing comprises
      a first case having an open end that is open in the axial direction of the rotating shafts, and
      a second case having another open end that is open in the axial direction of the rotating shafts and faces the open end of the first case, and
   wherein when the transmission is assembled, the fixed end of the baffle plate is secured to the first case, and the second case is placed over the supported end of the baffle plate and joined to the first case to which the fixed end of the baffle plate is secured, so that the protruding ribs are positioned to have the clearance with respect to the supported end.

8. The baffle plate support structure for the transmission according to claim 1,
   wherein the casing comprises
      a first case having an open end that is open in the axial direction of the rotating shafts, and
      a second case having another open end that is open in the axial direction of the rotating shafts and faces the open end of the first case, and
   wherein when the transmission is assembled, the fixed end of the baffle plate is secured to the first case, and the second case is placed over the supported end of the baffle plate and joined to the first case to which the fixed end of the baffle plate is secured, so that the protruding ribs are positioned to have the clearance with respect to the supported end.

* * * * *